(12) United States Patent
Tong

(10) Patent No.: US 10,743,485 B2
(45) Date of Patent: Aug. 18, 2020

(54) GROW BOX AND PLANT GROWER USING THE SAME GROW BOX

(71) Applicant: Ki Wa Tong, Hong Kong (HK)

(72) Inventor: Ki Wa Tong, Hong Kong (HK)

( * ) Notice: Subject to any disclaimer, the term of this patent is extended or adjusted under 35 U.S.C. 154(b) by 274 days.

(21) Appl. No.: 16/044,498

(22) Filed: Jul. 24, 2018

(65) Prior Publication Data

US 2019/0246582 A1 Aug. 15, 2019

(30) Foreign Application Priority Data

Feb. 9, 2018 (CN) .......................... 2018 1 0132163

(51) Int. Cl.
| | | |
|---|---|---|
| *A01G 31/02* | (2006.01) | |
| *A01G 27/00* | (2006.01) | |
| *A01G 7/04* | (2006.01) | |
| *A01G 29/00* | (2006.01) | |
| *A01G 9/24* | (2006.01) | |
| *A01G 9/16* | (2006.01) | |
| *A01G 9/02* | (2018.01) | |

(52) U.S. Cl.
CPC ........... *A01G 27/008* (2013.01); *A01G 7/045* (2013.01); *A01G 9/16* (2013.01); *A01G 9/24* (2013.01); *A01G 9/249* (2019.05); *A01G 27/003* (2013.01); *A01G 29/00* (2013.01); *A01G 9/028* (2013.01); *A01G 9/243* (2013.01); *A01G 31/02* (2013.01); *Y02P 60/216* (2015.11)

(58) Field of Classification Search
CPC ......... A01G 31/00; A01G 31/02; A01G 31/06
See application file for complete search history.

(56) References Cited

U.S. PATENT DOCUMENTS

| | | | | |
|---|---|---|---|---|
| 2,189,510 A | * | 2/1940 | Swaney ................ | A01G 31/02 47/63 |
| 9,113,606 B2 | * | 8/2015 | Gardner ................ | A01G 31/00 |
| 10,072,880 B2 | * | 9/2018 | Newsam ................ | F25B 21/02 |
| 10,383,292 B2 | * | 8/2019 | Jollie .................... | A01G 31/02 |
| 2005/0155286 A1 | * | 7/2005 | Soukup ................. | A01G 31/00 47/60 |
| 2014/0101999 A1 | * | 4/2014 | Gardner ................ | A01G 31/00 47/62 C |
| 2017/0071143 A1 | * | 3/2017 | Newsam ................ | A01G 9/246 |
| 2018/0338440 A1 | * | 11/2018 | Dearinger ............ | A01G 9/0295 |

FOREIGN PATENT DOCUMENTS

| | | |
|---|---|---|
| CN | 203482713 U | 3/2014 |
| CN | 105583102 A | 5/2016 |
| CN | 205794381 U | 12/2016 |
| CN | 205848244 U | 1/2017 |
| CN | 107637506 A | 1/2018 |

* cited by examiner

*Primary Examiner* — Kristen C Hayes

(57) ABSTRACT

A grow box comprises a box body and a cover which are matched with each other; a planting unit arranged on the grow box for planting plants; a nutrient solution supply unit comprising a nutrient solution storage chamber and an atomizer, and the nutrient solution is supplied to the roots of the plants under the condition that the plants lack nutrient solution, wherein the nutrient solution storage chamber is constructed as a part of box body space which is separated from the box body by a partition plate. The present invention further discloses a plant grower using the same grow box with a supporting device. In addition, various sensors are arranged in the grow box and the plant grower to perform automatic induction without the need of manual operation, so that the pleasure and the simplicity of planting are enhanced.

26 Claims, 18 Drawing Sheets

GROW BOX AND PLANT GROWER USING THE SAME GROW BOX

CROSS REFERENCE TO RELATED APPLICATIONS

The present application claims the benefit of Chinese Patent Application No. 201810132163.3 filed on Feb. 9, 2018. All the above are hereby incorporated by reference.

FIELD OF THE INVENTION

The present invention is related to the field of plant cultivation, and particularly, to a grow box and a plant grower using the same grow box for cultivating plants in window box, so as to satisfy the need of the urban community for farming food.

BACKGROUND OF THE INVENTION

In recent years, the public has become increasingly aware of food safety problems. More and more people are interested in farming food at home, but it is difficult to accomplish in densely populated cities. This is because farming food requires a lot of time and effort, and there is no space in high-rise building for the people to do so.

There are technologies for soilless cultivation in the prior art, such as automated soilless cultivation technologies for home-use, including hydroponic or aquaponic systems, which are very expensive. Even if these systems can be placed in window box, the use of water pumps and water tanks will generate disturbing noise and reduce the actual planting space for certain. For example, the Chinese Patent Publication CN 205794381 U discloses an ultrasonic atomizing plant grower, which belongs to the field of soilless cultivation. It comprises a fuselage having a cavity therein; the top of the fuselage is provided with a cover for covering the cavity; the cover is provided with a plurality of planting baskets having planting chambers therein; the lower parts of the planting baskets extend into the cavity of the fuselage; the cavity of the fuselage is provided with a water supply unit for supplying water to the planting chambers; and the cover is provided with a moisture supply unit for supplying moisture to the planting baskets. The plant grower also includes a controller and a lighting unit, while the water supply unit and the lighting unit are electrically connected with the controller. The structure of the plant grower is simple. It is not made for cultivating plants in window box, and cannot perform intelligent management and control. In addition, the atomizer is placed at the bottom of the box body, so that the atomizer cannot work when the water level of the nutrient solution is excessively high; and there is no nutrient solution storage chamber separated from the box body by a partition plate, so that the root of the plant is soaked into the nutrient solution causing root rot.

For example, the Chinese Patent Publication CN 203482713 U discloses a grow box, which supplies mist to the plants in a sealed environment without any air ventilation or air supply device. In consequence, the carbon dioxide content in the air and the plant growth rate are affected.

Therefore, it is necessary to improve the prior art through intelligent management and control to facilitate plant cultivation, as well as to design a novel grow box and a plant grower using the same grow box for cultivating plants in window box.

SUMMARY OF THE INVENTION

The present invention aims to solve the above technical problems by providing a novel grow box, which comprises a control device, various sensors and a plurality of atomizers to accomplish plant cultivation through intelligent management and control; a partition plate to prevent the root of the plant from being soaked into the nutrient solution causing root rot; a solar device to reduce energy consumption; a greenhouse cover and an air supply device to create greenhouse effect for the plants; and a capability to adopt different types of atomizers, making the grow box convenient and flexible to operate.

The present invention also aims to solve the above technical problems by providing a novel plant grower with a supporting device, which can be placed in a window box lifting up and down, to facilitate people with different heights to process farming tasks through a window frame.

In order to achieve the above objectives, according to another aspect of the present invention, the present invention adopts the following technical solutions:

A grow box, comprising:
  a box body;
  a cover constructed to match with the box body and cover the box body;
  a planting unit arranged on the grow box for planting plants;
  a nutrient solution supply unit comprising a nutrient solution storage chamber and an atomizer, the nutrient solution supply unit constructed to supply nutrient solution to the roots of the plants under the condition that the plants lack nutrient solution;
  wherein the nutrient solution storage chamber is constructed as a part of box body space which is separated from the box body by a partition plate;
  and the partition plate is provided with a mounting position for installing the atomizer; and
  wherein the atomizer comprises a liquid absorbing component and an atomizer nozzle with a microporous atomizing sheet, the atomizer nozzle being arranged on the mounting position and connected to the liquid absorbing component.

According to the grow box, the planting unit comprises a plurality of planting baskets which passes through, in one-to-one correspondence manner, a plurality of pre-arranged holes on the cover and sits inside the box body, in which the planting baskets are supported by the cover.

According to the grow box, the partition plate is abutted against the inner wall of the box body, and the partition plate is configured with a certain degree of inclination, so as to facilitate guiding liquid to flow into the nutrient solution storage chamber. Further, a liquid removing hole is formed on the partition plate.

Further, a mounting position for installing the atomizer is arranged on the partition plate.

Preferably, the atomizer comprises a liquid absorbing component and an atomizer nozzle with a microporous atomizing sheet, the atomizer nozzle being arranged on the mounting position and connected to the liquid absorbing component.

Further, the partition plate is provided with a liquid inlet pipe, and one end of the liquid inlet pipe passes through a pre-arranged hole on the cover, while the other end passes through the partition plate and reaches the nutrient solution storage chamber.

According to one embodiment of the grow box, the atomizer is a buoyancy atomizer comprising an atomizer nozzle, while an atomizer limiting component is arranged on the mounting position, so that the atomizer can be arranged in the limiting component, wherein the limiting component is immersed into the nutrient solution storage chamber.

Further, the limiting component is a limiting hood, the buoyancy atomizer is limited within the limiting hood and is in float along with the liquid level. Preferably, the atomizer is provided with a buoyancy structure, and the atomizer nozzle is arranged in the buoyancy structure.

Preferably, the partition plate is provided with a liquid inlet pipe, and one end of the liquid inlet pipe passes through a pre-arranged hole on the cover, while the other end passes through the partition plate and reaches the nutrient solution storage chamber.

Preferably, a water level gauge is arranged on the liquid inlet pipe, so as to observe the remaining amount of the nutrient solution, such as a float-type water level gauge, an electronic water level gauge or any other type of water level gauge.

According to one embodiment of the grow box, the grow box comprises a control device which is arranged on the box body and is electrically connected with the atomizer so as to automatically supply the nutrient solution to the plants.

According to one embodiment of the grow box, the grow box further comprises a mist concentration sensor, which is arranged in the grow box and is in communication with the control device, so as to detect whether the nutrient solution required by the plants is exhausted, or whether the atomizer works correctly.

According to one embodiment of the grow box, a lighting component is arranged at the top of the grow box and is electrically connected with the control device, so as to supplement light to the plants under the condition that the environment is lack of light.

Further, the lighting component is connected with a photometric sensor and is electrically connected with the control device, so as to detect the brightness of the environment.

Further, the lighting component is arranged at the edge of the box body through a connecting assembly with a multi-position hinge, which controls the state of the lighting component to be folded or unfolded by changing the hinge position.

According to one embodiment of the grow box, the grow box comprises a solar device, which is arranged on one side of the box body, so as to receive solar energy to charge a rechargeable battery and supply power to the control device.

According to one embodiment of the grow box, the control device comprises a wireless communication device to communicate with an external intelligent terminal, so as to remotely control and manage the grow box.

According to one embodiment of the grow box, a transparent greenhouse cover is arranged on the box body, so as to create greenhouse effect for the plants. Preferably, the greenhouse cover comprises a movable cover element and a hole, and the hole of the greenhouse cover is used for creating a passage of cables and pipelines, such as a passage for the cables connected with the mist concentration sensor and the atomizer.

Further, an air supply device is arranged on the box body and is electrically connected with the control device, so as to supply fresh air into the greenhouse cover and/or into the box body through a pipeline.

According to one embodiment of the grow box, each of the planting baskets is provided with a moisturizing cap, so as to prevent the nutrient solution from being dried.

According to another aspect of the present invention, the present invention provides a plant grower comprising a supporting device and the grow box which is arranged in the supporting device, wherein the supporting device comprises:

a frame;

a holder arranged on the frame for holding the grow box; and a height and inclination adjusting assembly arranged on two sides of the frame and the holder, so as to adjust the lifting height and/or the inclination angle of the holder.

Further, the height and inclination adjusting assembly comprises two sets of components, one set of components is arranged at one end of the frame, and the other set of components is arranged at the opposite end of the frame, each set of components comprises a sliding rail, a sliding block and two stay hinges, wherein the sliding rail is fastened on the frame, and one end of the sliding block is arranged on one side of the holder, and the other end of the sliding block is arranged in the sliding rail, so as to be capable to slide along the sliding rail.

Further, one end of the stay hinge is fastened on the frame, and the other end of the stay hinge is fastened on the holder, so as to slide the sliding block vertically through the movement of the stay hinge, or to set the holder inclined at certain angle under the condition that the sliding block is fixed.

The grow box of the present invention is provided with a mist concentration sensor and a plurality of atomizers. If the control device detects that an individual atomizer is abnormal, the other atomizer is automatically started to prevent the plants from being dried to death.

The atomizer adopted by the present invention works regardless the water level of the nutrient solution. It will not happen that the atomizer cannot work when the water level of the nutrient solution is excessively high.

In addition, the arrangement of the partition plate inside the box body prevents the root of the plant from being soaked into the nutrient solution causing root rot; collects the liquid, which is formed from the unabsorbed nutrient mist, back into the nutrient solution storage chamber under the partition plate; and maintains the atomizer nozzle at the best position to accomplish optimal atomizing effect.

The plant grower of the present invention is provided with a supporting device, which can be placed in a window box lifting up and down, to facilitate people with different heights to operate the plant grower, as well as to allow the plant grower being placed in the outdoor environment.

In addition, the grow box of the present invention is provided with various sensors, such as a mist concentration sensor and a photometric sensor, and a plurality of atomizers to perform automatic induction. Under the condition that the nutrient solution is exhausted; the environment is lack of light; or the atomizer is abnormal, the grow box automatically starts atomizing or lighting without the need of manual operation, so that the pleasure and the simplicity of planting are enhanced. Moreover, the extra arrangement of the wireless communication device, such as a WI-FI transceiver and/or a Bluetooth transceiver, can get the grow box connected with an external intelligent terminal, so that people can perform intelligent management and control to the grow box through a mobile phone or a computer, and thus the pleasure of planting is further enhanced.

The arrangement of solar panel is charged using the sunlight from the outdoor environment, so as to reduce power consumption cost, as well as to accomplish energy-saving for the environment.

BRIEF DESCRIPTION OF THE DRAWINGS

The structure and the operation principles of the present invention are described in detail with reference to the attached drawings, wherein.

DETAILED DESCRIPTION OF THE PREFERRED EMBODIMENTS

The particular embodiments of the present invention are described in detail with reference to the attached drawings, so as to understand the structure and the operation principles of the present invention.

In the description below, the grow box and the plant grower of the present invention are described in combined structure to facilitate understanding the entire structure, as well as understanding the independent structures of the grow box and the plant grower.

Figure 1:
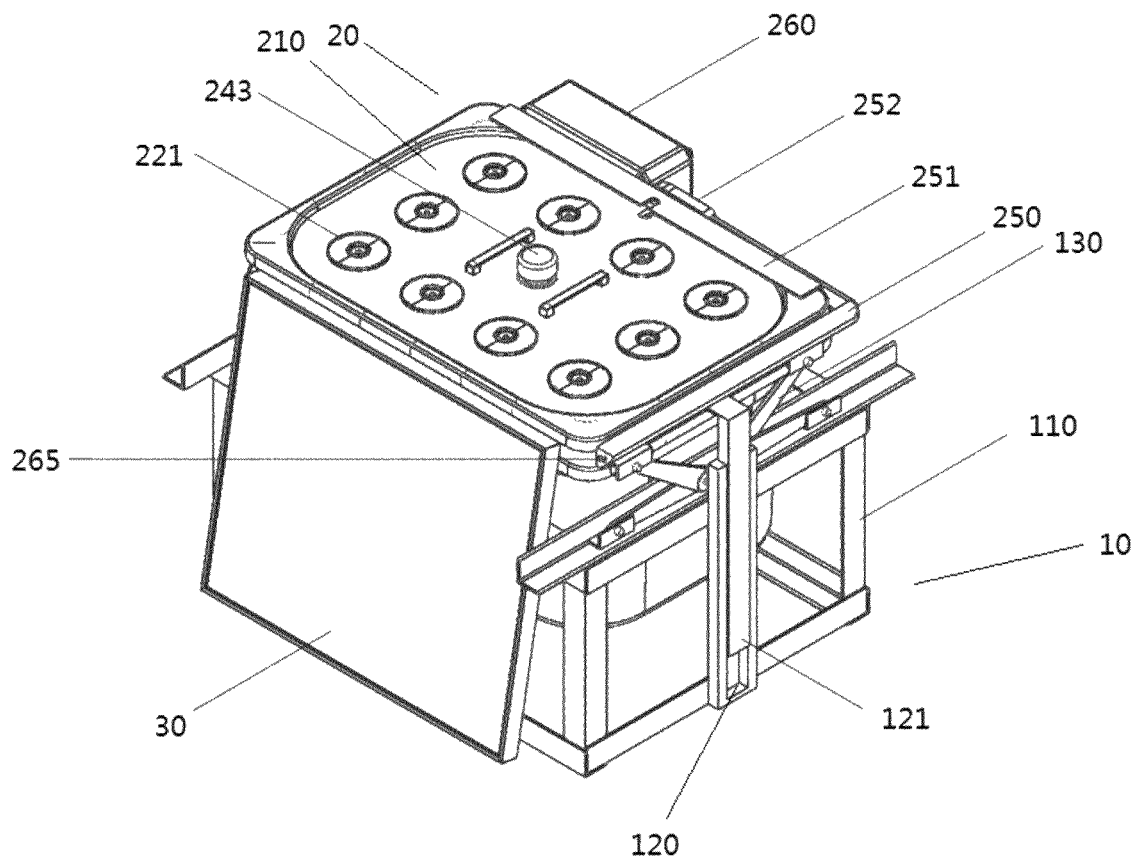
FIG. 1 is a structural diagram of the plant grower of the present invention.
Figure 2:
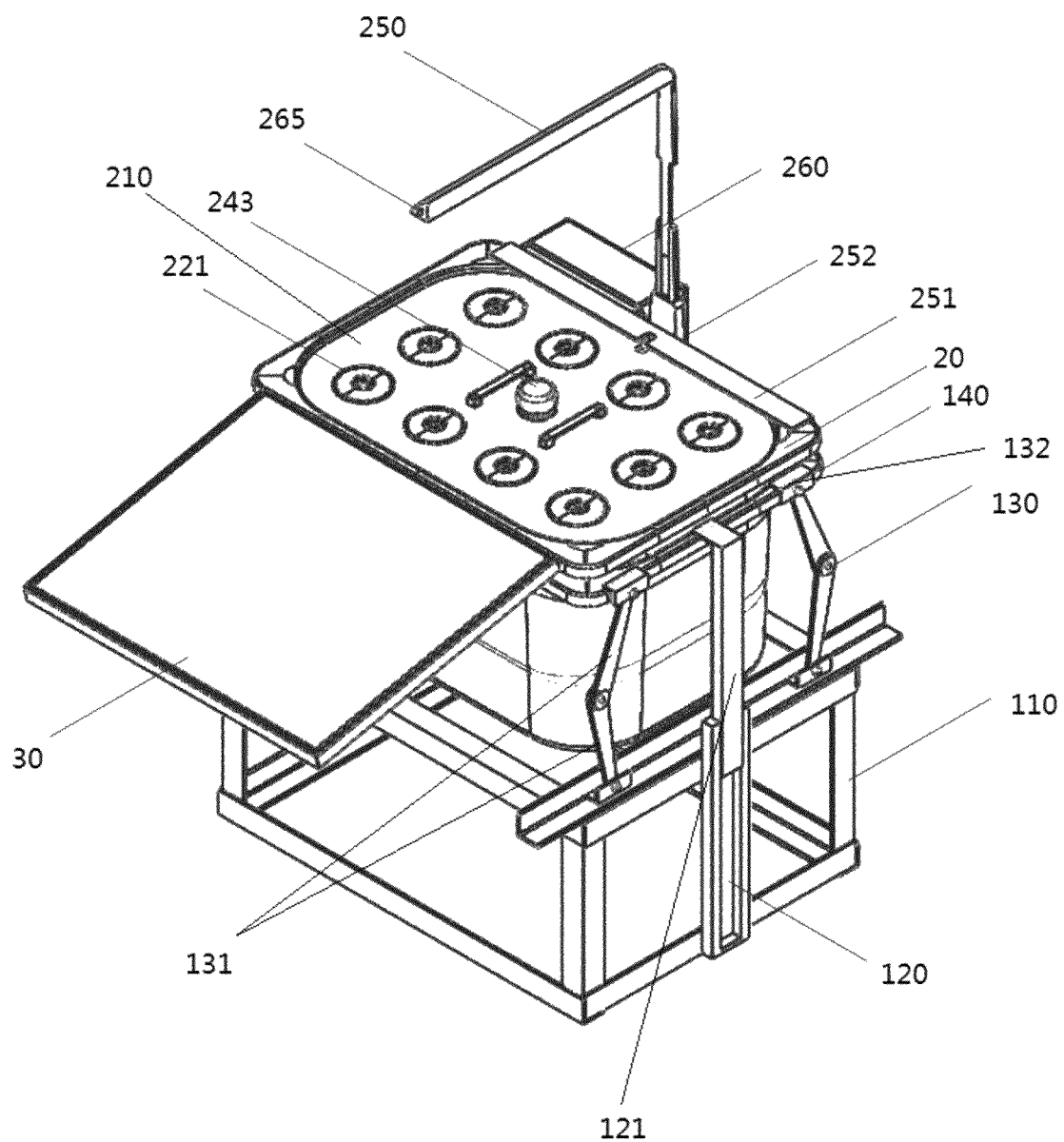
FIG. 2 shows the grow box being lifted by the supporting device shown in FIG. 1.
Figure 3:
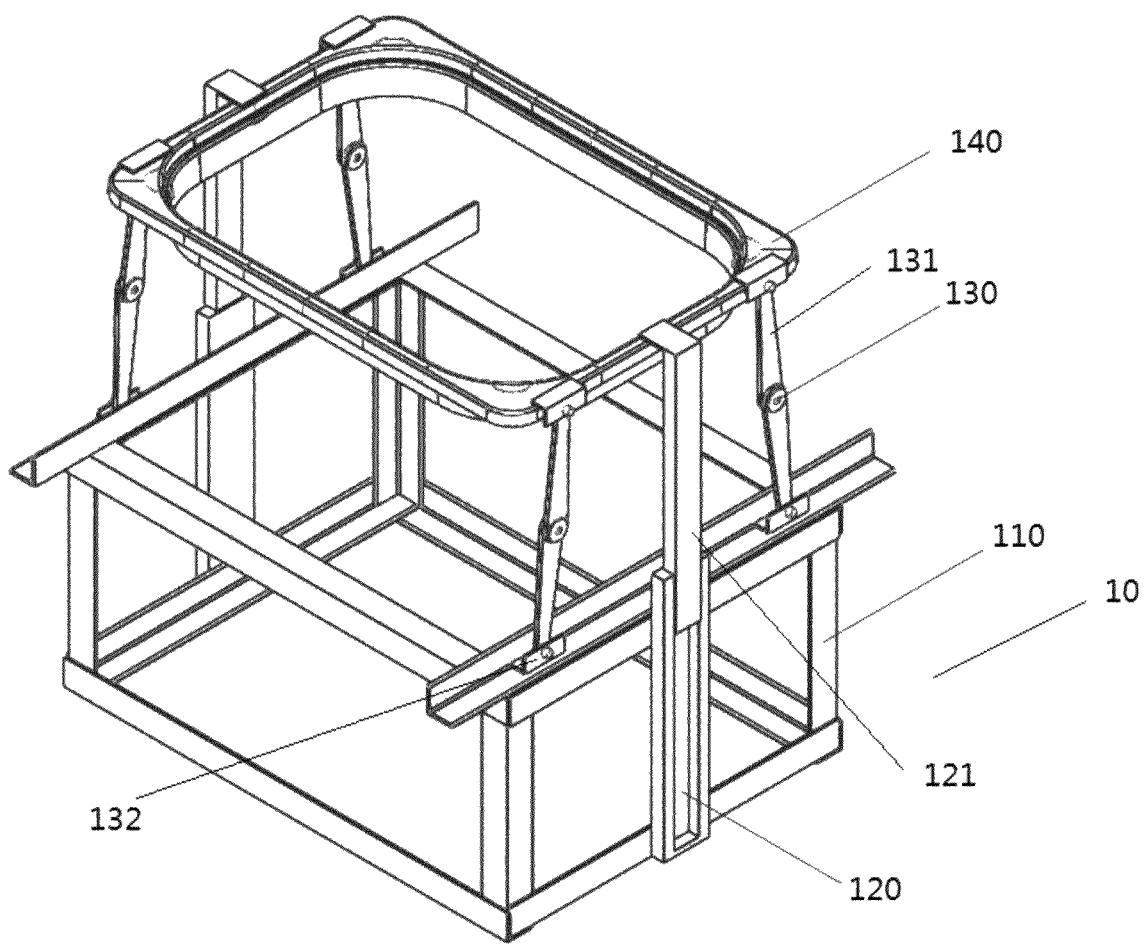
FIG. 3 is a structural diagram of the supporting device shown in FIG. 1.

As shown in FIGS. 1-3, the plant grower comprises a supporting device 10 and a grow box 20 arranged in the supporting device 10. The supporting device 10 can be movably arranged in an outdoor environment, such as in a window box. The supporting device 10 can be made into a different shape to match with the window box, such as a rectangular shape or a circular shape in cross-sectional view, and to place in the window box for cultivating plants.

The supporting device 10 comprises a frame 110 and a holder 140. The holder 140 is arranged on the frame 110 and is used for holding the grow box 20; the frame 110 is made of a plurality of materials with sufficient strength and rigidity, such as stainless steel, aluminum alloy or angle iron. The materials are fastened together by welding or other fastening manner. The design of the holder 140 is matched with the grow box 20, so as to hold the grow box 20 in place.

The frame 110 is provided with a height and inclination adjusting assembly, so as to adjust the lifting height and/or the inclination angle of the holder 140. The height and inclination adjusting assembly is arranged on two sides of the frame and the holder, so as to adjust the lifting height and/or the inclination angle of the holder. The height and inclination adjusting assembly comprises two sets of components, one set of components is arranged at one end of the frame 110, and the other set of components is arranged at the opposite end of the frame 110, each set of components comprises a sliding rail 120, a sliding block 121 and two stay hinges 130, wherein the sliding rail 120 is fastened on the frame 110, one end of the sliding block 121 is arranged on one side of the holder 140, and the other end of the sliding block 121 is arranged in the sliding rail 120, so as to be capable to slide along the sliding rail 120 for lifting the holder 140 up and down. The sliding block 121 is arranged in the sliding rail 120 to support the holder 140. The two stay hinges 130 of each set of components are arranged on both sides of the sliding block 121. Each stay hinge 130 is provided with supporting bars 131. The two ends of each stay hinge 130 are respectively fastened on the holder 140 and the frame 110 with the fixtures 132, so as to assist the sliding block 121 in supporting the holder 140. In an embodiment, the stay hinge 130 does not require the use of fixture, instead, the two ends of each stay hinge 130 are directly fastened on the holder 140 and the frame 110.

Figure 4:
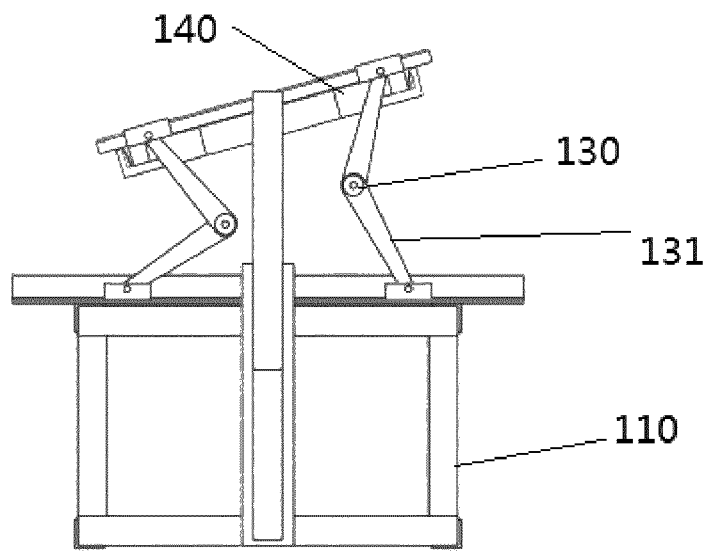
FIG. 4 is a structural diagram of the supporting device shown in FIG. 3 being vertically lifted with a certain angle of inclination.
Figure 5:
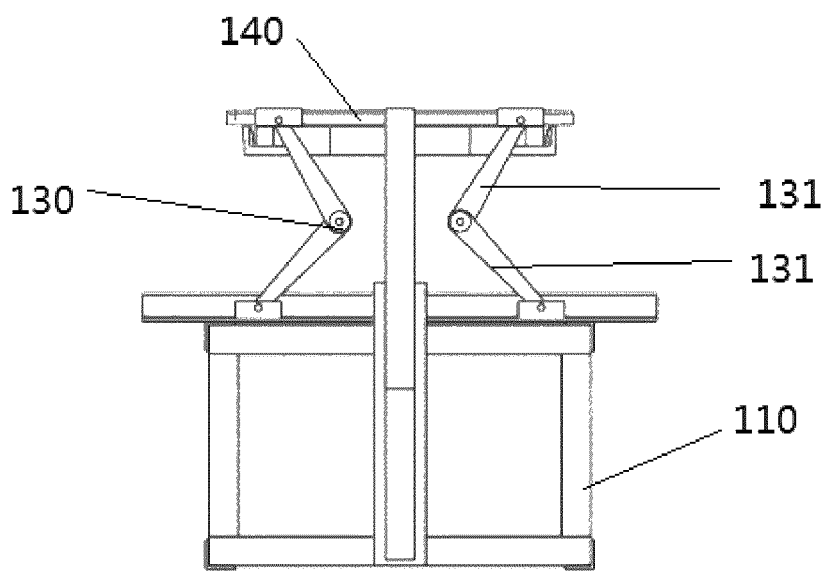
FIG. 5 is a structural diagram of the supporting device shown in FIG. 3 being vertically lifted at a certain height.
Figure 6:
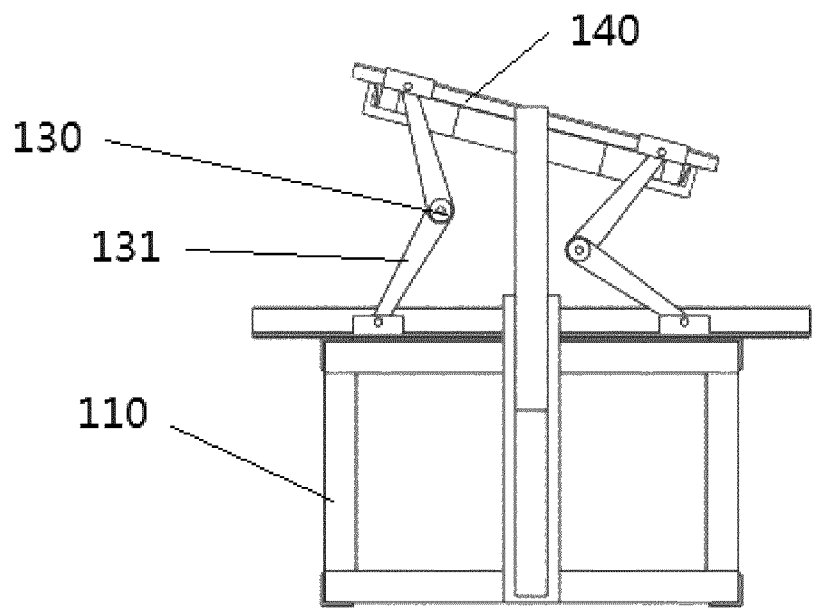
FIG. 6 is a structural diagram of the supporting device shown in FIG. 3 being vertically lifted with a certain angle of inclination towards the other direction.
Figure 7:
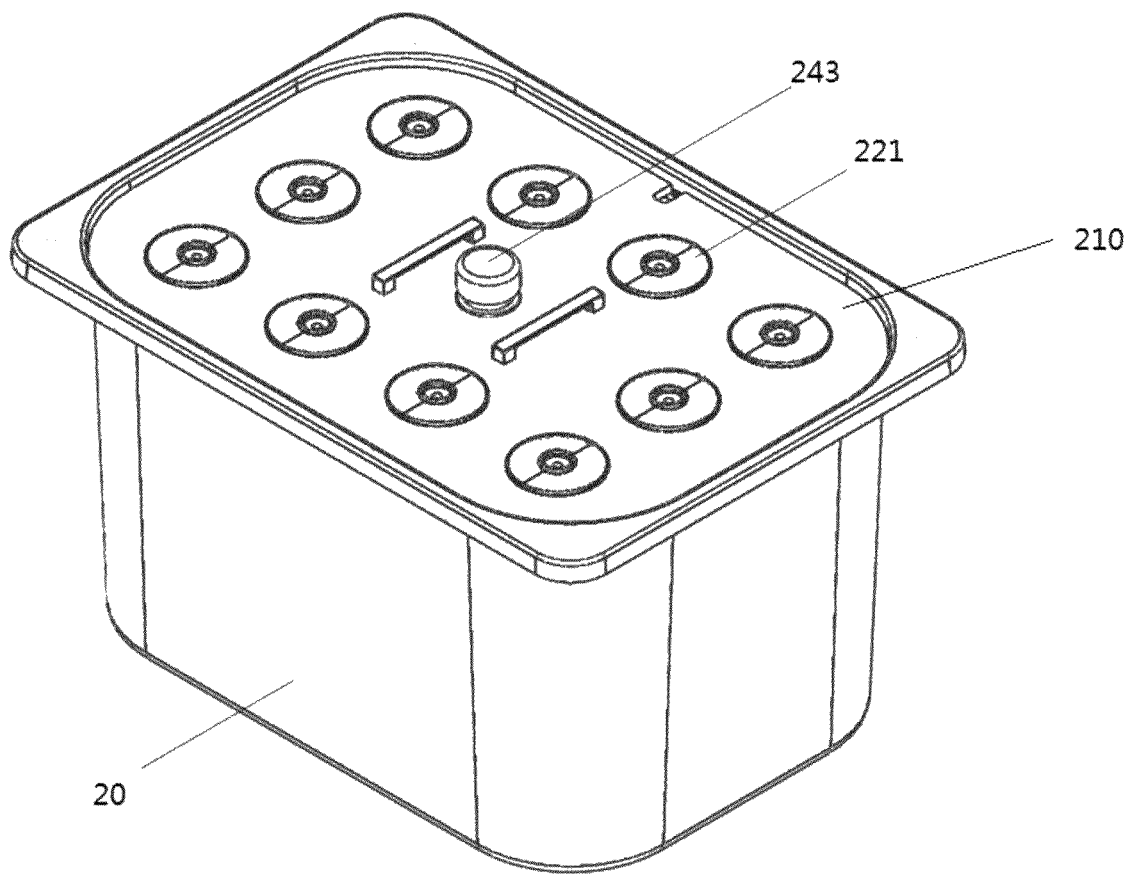
FIG. 7 is a diagram of the grow box of the present invention.
Figure 8:
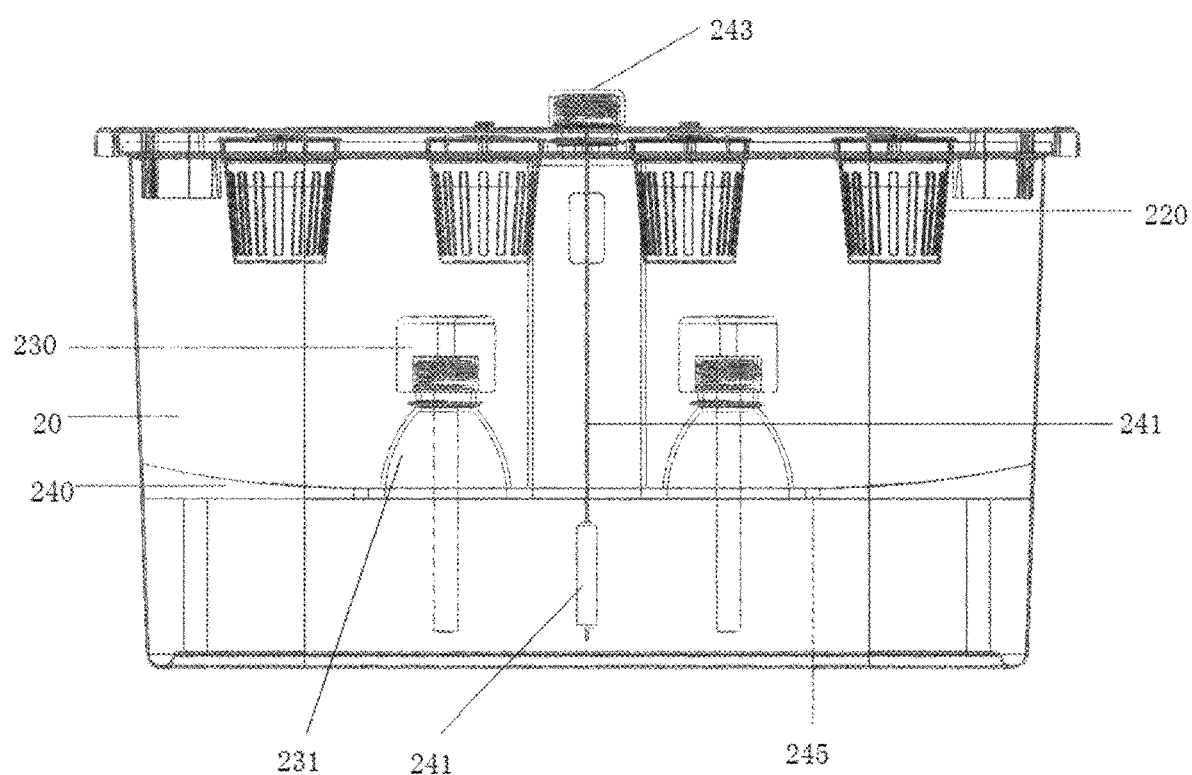
FIG. 8 is an internal structural diagram of the grow box shown in FIG. 7.

As shown in FIGS. 4-6, the supporting bars 131 of the stay hinge 130 form a certain angle around the joint. When different angles are formed by one pair of the supporting bars with the other pair in correspondence manner, the holder 140 is inclined towards one side, in consequent, driving that the grow box 20 is inclined at the same angle, such as inclined at 10 degrees, so as to facilitate users to process farming tasks through a window frame. Sunlight collection is also facilitated under the condition that the grow box 20 is inclined. This is because the plants nearest to the window are usually not covered by sunlight, and thus become weak. As shown in FIG. 5, when the angles formed by both pairs of supporting bars 131 are consistent, the grow box 20 appears to be level.

As shown in FIGS. 7-17, the grow box 20 comprises an opaque box body with a cover 210, so as to prevent algae from growing inside the box body. The cover 210, which is also opaque, comprises a plurality of holes for holding a plurality of planting baskets 220. A planting sponge 222 is arranged in each planting basket 220. The holes on the cover 210 are matched with the planting baskets 220. A moisturizing cap 221 is arranged on each planting basket 220 and is matched with each planting basket 220, so as to prevent the nutrient solution in the planting baskets 220 from being dried. The planting sponge 222 can be replaced by coconut fibers or other substances with strong absorption properties.

The number of the planting baskets 220 is determined according to the size of the grow box 20, such as ten, twenty or even more or less, which can be adjusted by users according to their needs. The size of the planting baskets 220 affects the number of the planting basket 220, and all of these depend on the actual needs.

A nutrient solution supply unit is arranged inside the grow box 20, which supplies the atomized nutrient solution to the root of the plant to facilitate absorption. The nutrient solution supply unit inside the grow box 20 can be an atomizer and an independent liquid tank, or a nutrient solution storage chamber separated from the box body by a partition plate 240.

In the embodiment shown in FIGS. 8-16, the nutrient solution supply unit is arranged in the partition plate manner, such as adopting a board for separation. The partition plate prevents the root of the plant from being soaked into the nutrient solution causing root rot.

Figure 9:
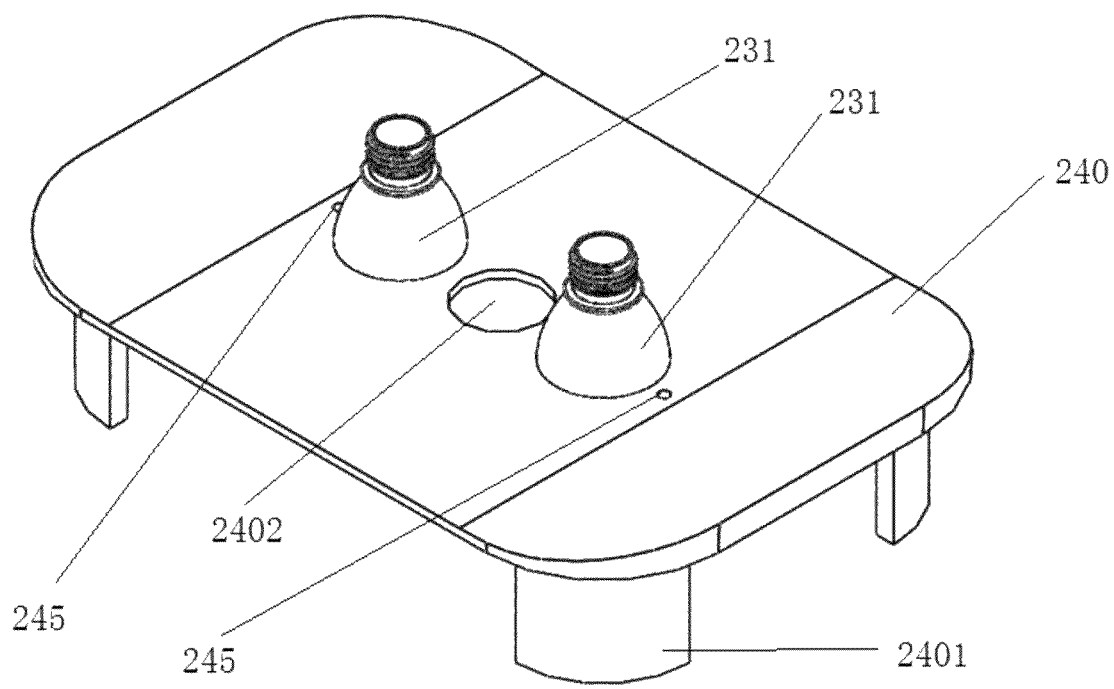
FIG. 9 is an embodiment diagram of the partition plate of the grow box shown in FIG. 7.
Figure 10:
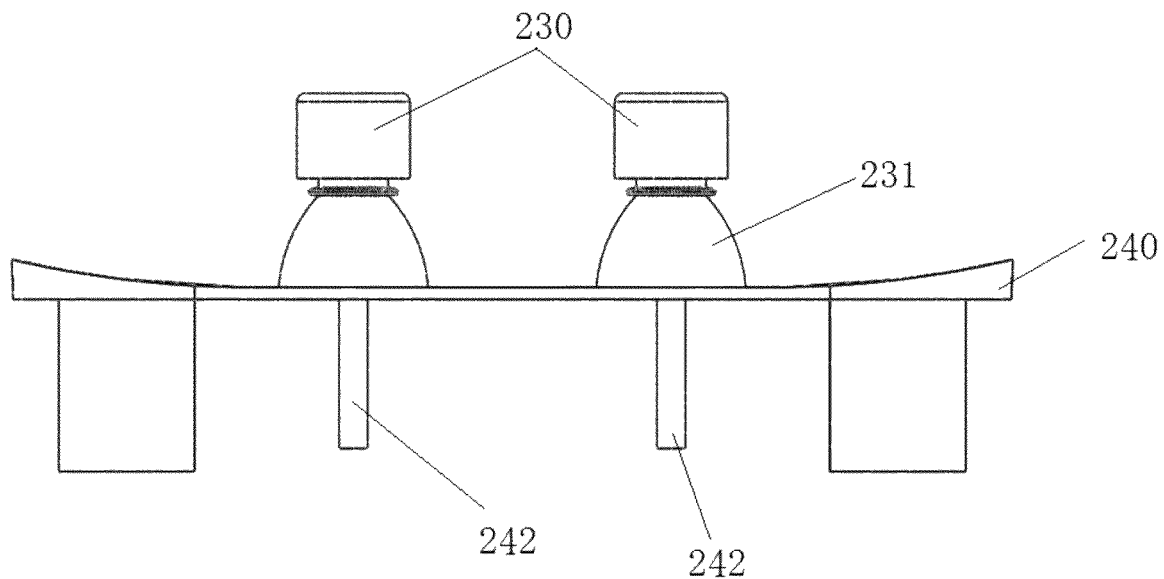
FIG. 10 is an installation diagram of the atomizer of the partition plate shown in FIG. 9.
Figure 11:
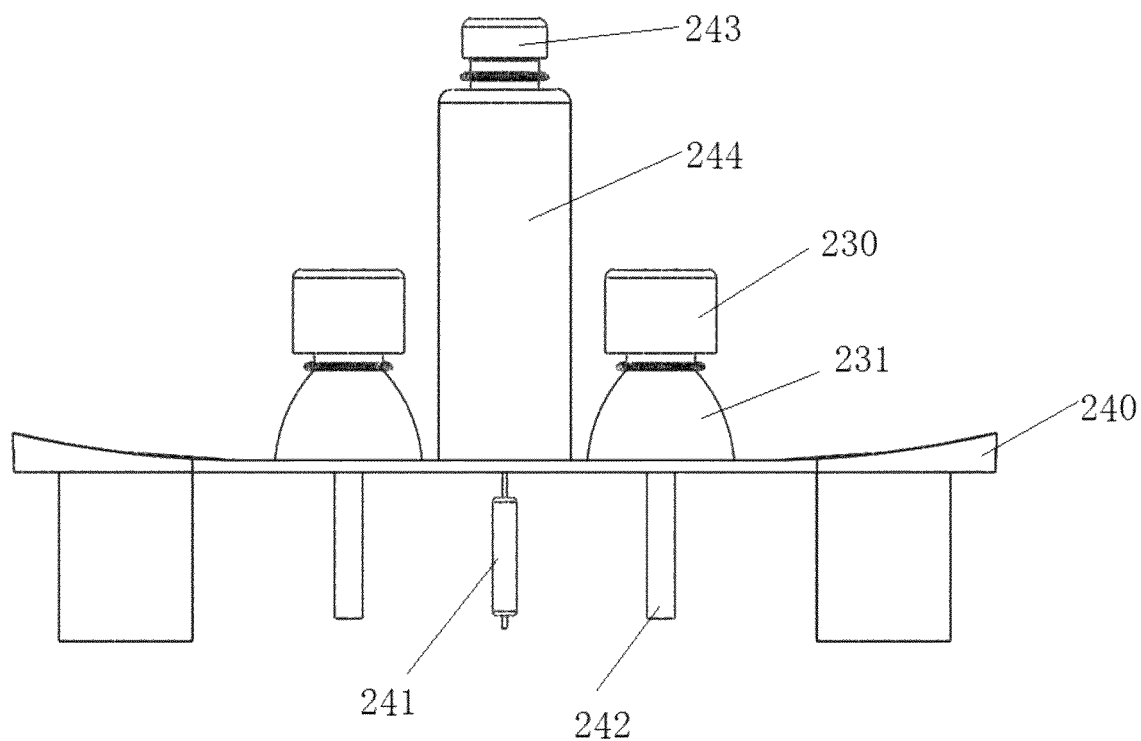
FIG. 11 is a diagram of the atomizer of the partition plate shown in FIG. 9 with a liquid inlet pipe.

As an embodiment of the partition plate 240 shown in FIGS. 9-11, the partition plate 240 is designed with a certain angle of inclination and a liquid removing hole 245, so as to collect the liquid back into the nutrient solution storage chamber. For example, the partition plate 240 can be designed into a bowl shape or arch shape or other shape with a certain angle of inclination for backflow. The partition plate 240 is provided with four feet 2401 to assist in sitting inside the box body of the grow box 20.

At least one atomizer is installed on the partition plate. In this embodiment, there are two atomizers 230 are installed on the mounting positions 231 of the partition plate 240, which supply the atomized nutrient solution to the root of the plant to facilitate absorption. The liquid absorbing component 242 of the atomizer 230 is connected to an atomizer nozzle with a microporous atomizing sheet. After absorbed with the nutrient solution, the nutrient solution is atomized and sprayed to the root of the plant. The mounting position 2402 of the partition plate 240 is provided with a liquid inlet pipe 244, which is used for refilling the nutrient solution into the nutrient solution storage chamber. The liquid inlet pipe 244 extends upwards and passes through the cover 210, where its opening at the top is sealed with a cap 243, so as to prevent the nutrient solution from being evaporated. When it is necessary to refill the nutrient solution or remove the cover 210 of the grow box 20, users need to take off the cap 243, and put on the cap 243 after the operation is done. A water level gauge 241, such as a float-type water level gauge or an electronic water level gauge, is arranged inside the liquid inlet pipe 244, so as to display the remaining amount of the nutrient solution.

After the atomizer 230 is done with atomizing, the excessive nutrient solution is gathered by the inclined partition plate 240, and is flown into the nutrient solution storage chamber through the liquid removing holes 245. This backflow design can avoid the nutrient solution wasting and accumulating out of the nutrient solution storage chamber.

Figure 12:
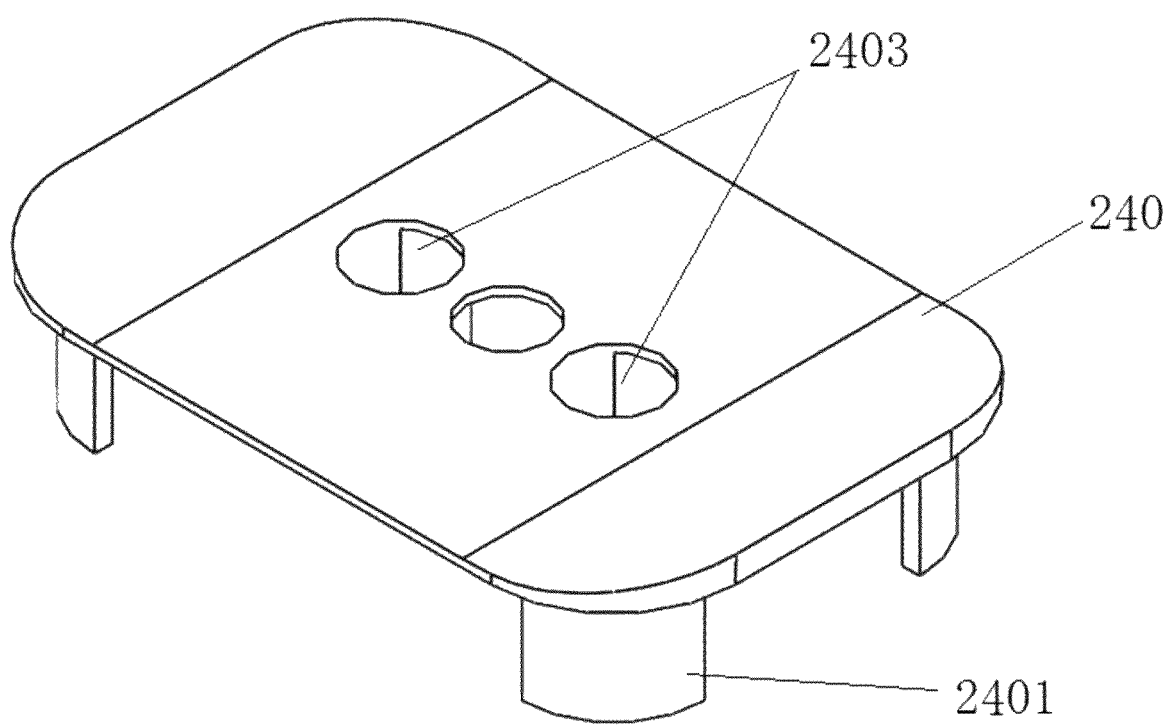
FIG. 12 is another embodiment diagram of the partition plate of the grow box of the present invention.
Figure 13:
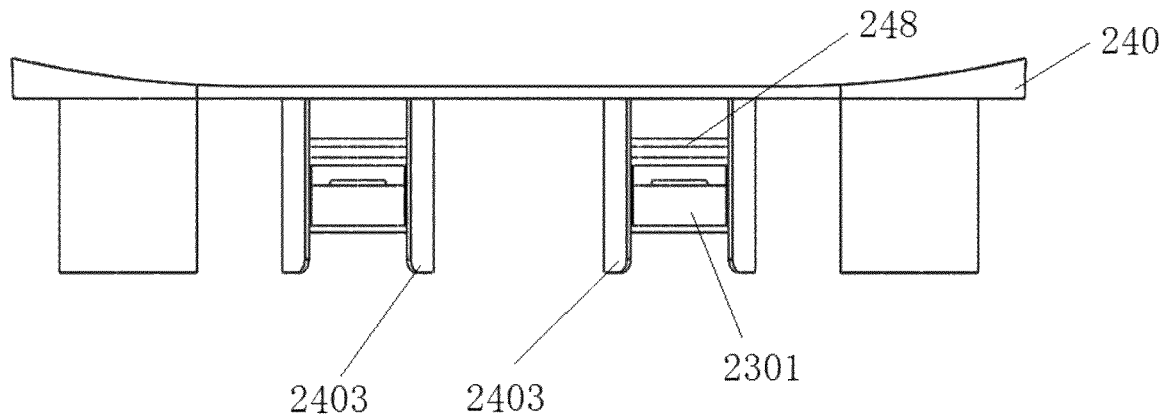
FIG. 13 is an installation diagram of the atomizer of the partition plate shown in FIG. 12.
Figure 14:
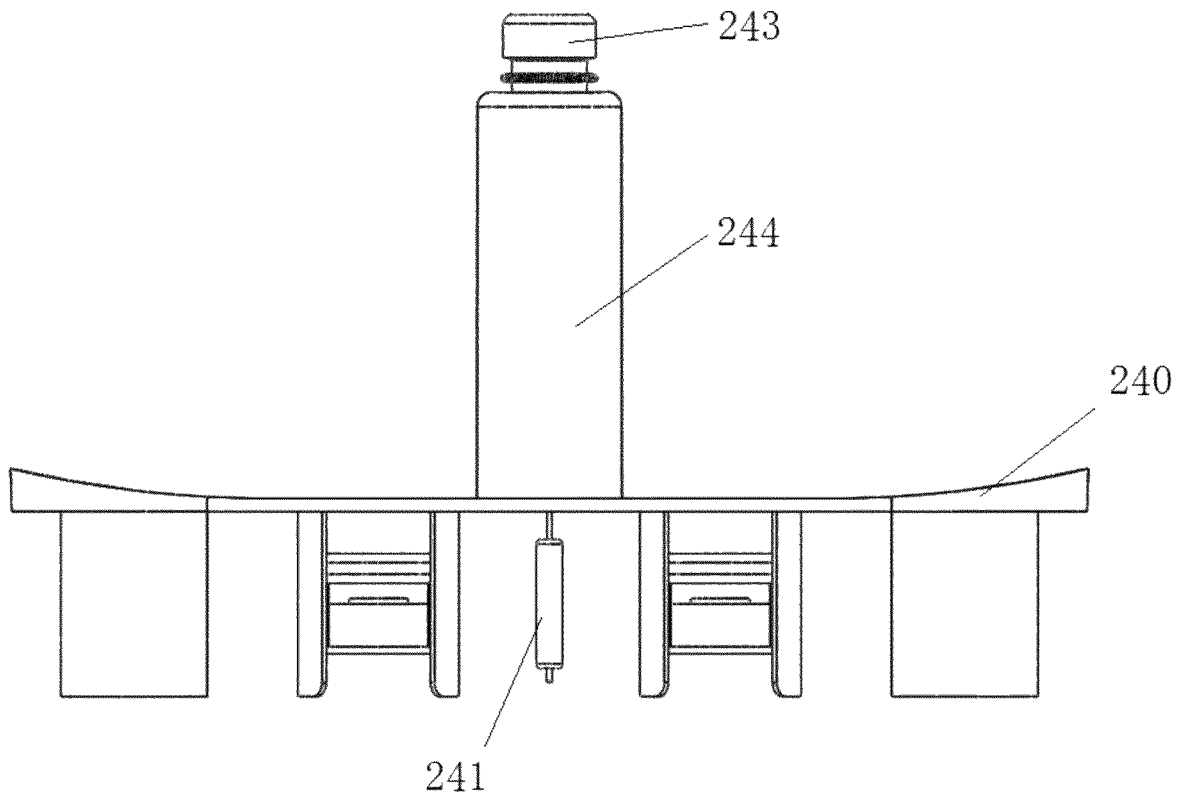
FIG. 14 is a diagram of the atomizer of the partition plate shown in FIG. 12 with a liquid inlet pipe.
Figure 15:
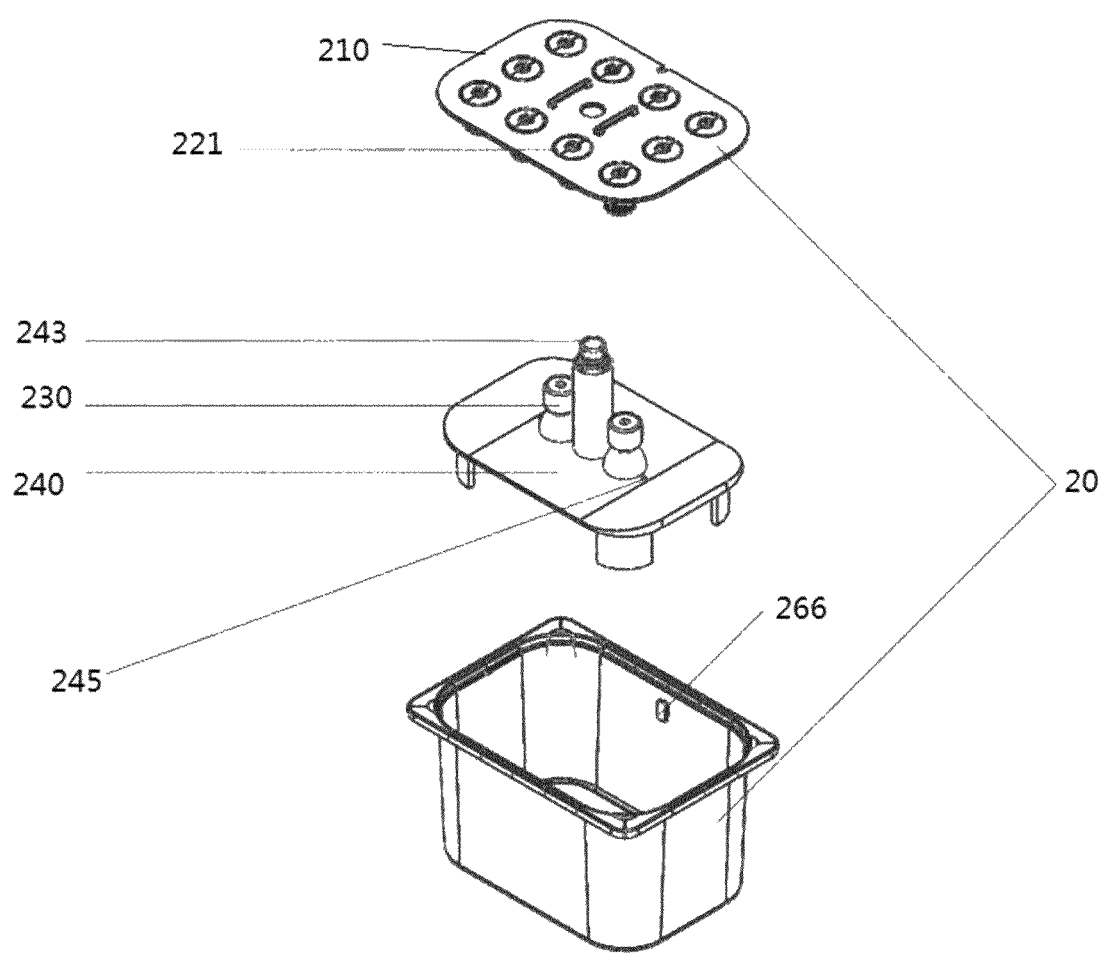
FIG. 15 is a structural assembly diagram of the grow box shown in FIG. 7.
Figure 16:
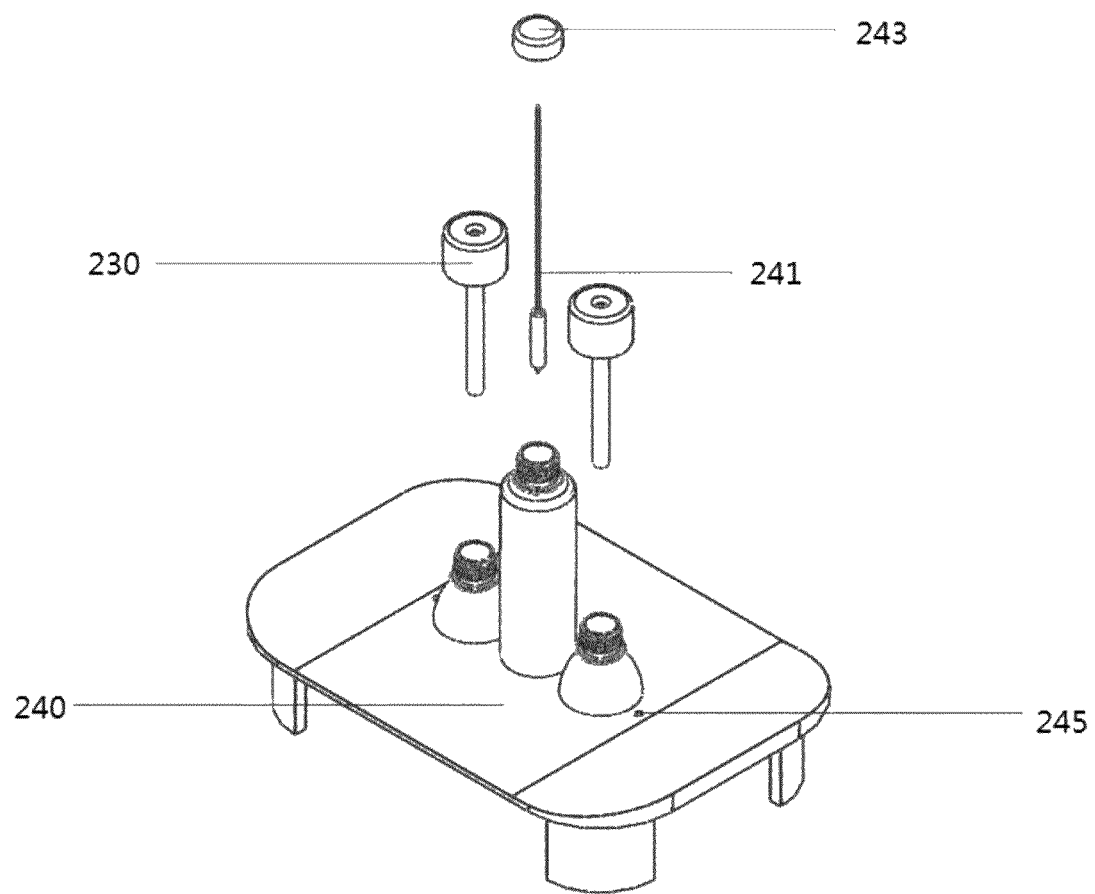
FIG. 16 is a structural assembly diagram of the partition plate and the atomizer shown in FIG. 15.
Figure 17:
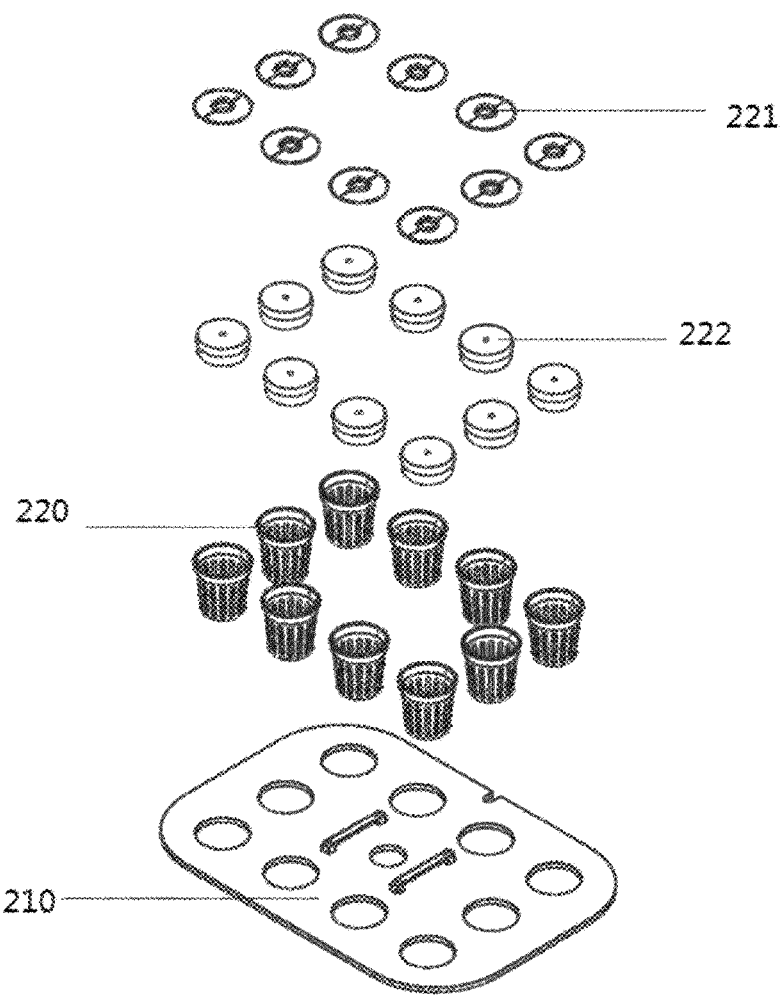
FIG. 17 is a structural assembly diagram of the cover of the grow box of the present invention.

As shown in FIGS. 12-14, in another embodiment of the partition plate, the atomizer 230 with the liquid absorbing component and the microporous atomizing sheet is replaced by the buoyancy atomizer 2301. Accordingly, the buoyancy atomizer 2301 is arranged in the limiting hood 2403 of the partition plate 240, and the nozzle of the buoyancy atomizer is arranged in the buoyancy structure 248. The other structures of the partition plate 240 in this embodiment are consistent with the previous embodiment, and thus are not described in detail herein.

Figure 18:
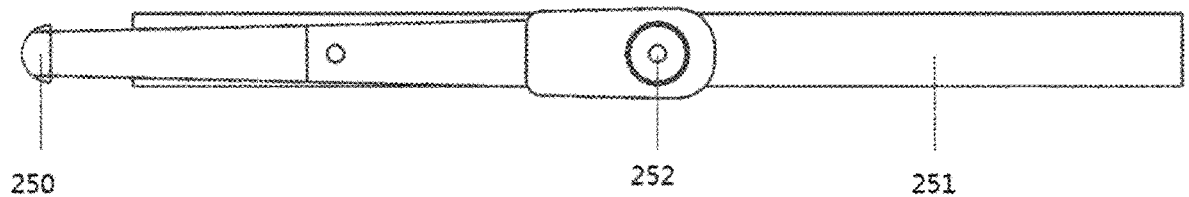
FIG. 18 is a structural diagram of the lighting component of the grow box of the present invention, wherein the lighting component is in the folded state.
Figure 19:
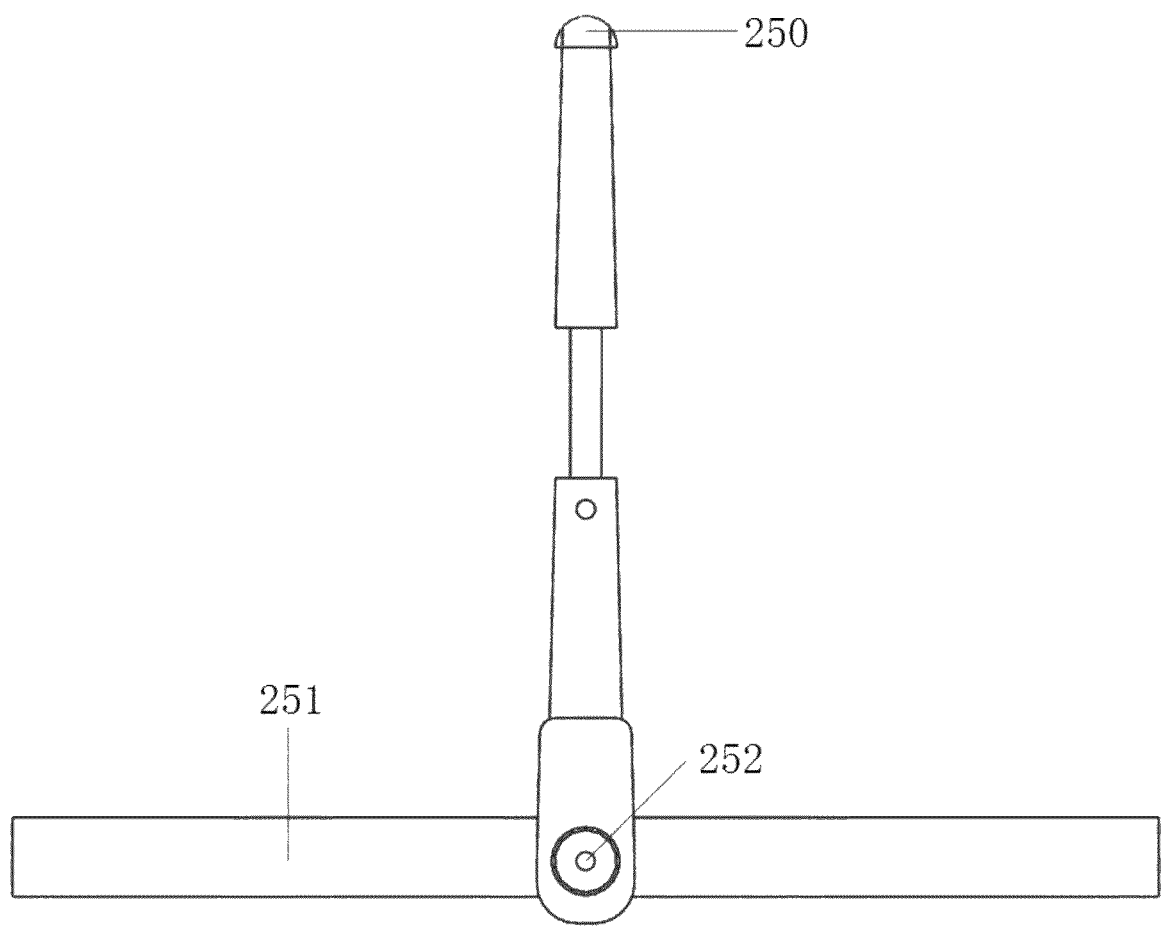
FIG. 19 is a structural diagram of the lighting component shown in FIG. 18, wherein the lighting component is in the unfolded state.
Figure 20:
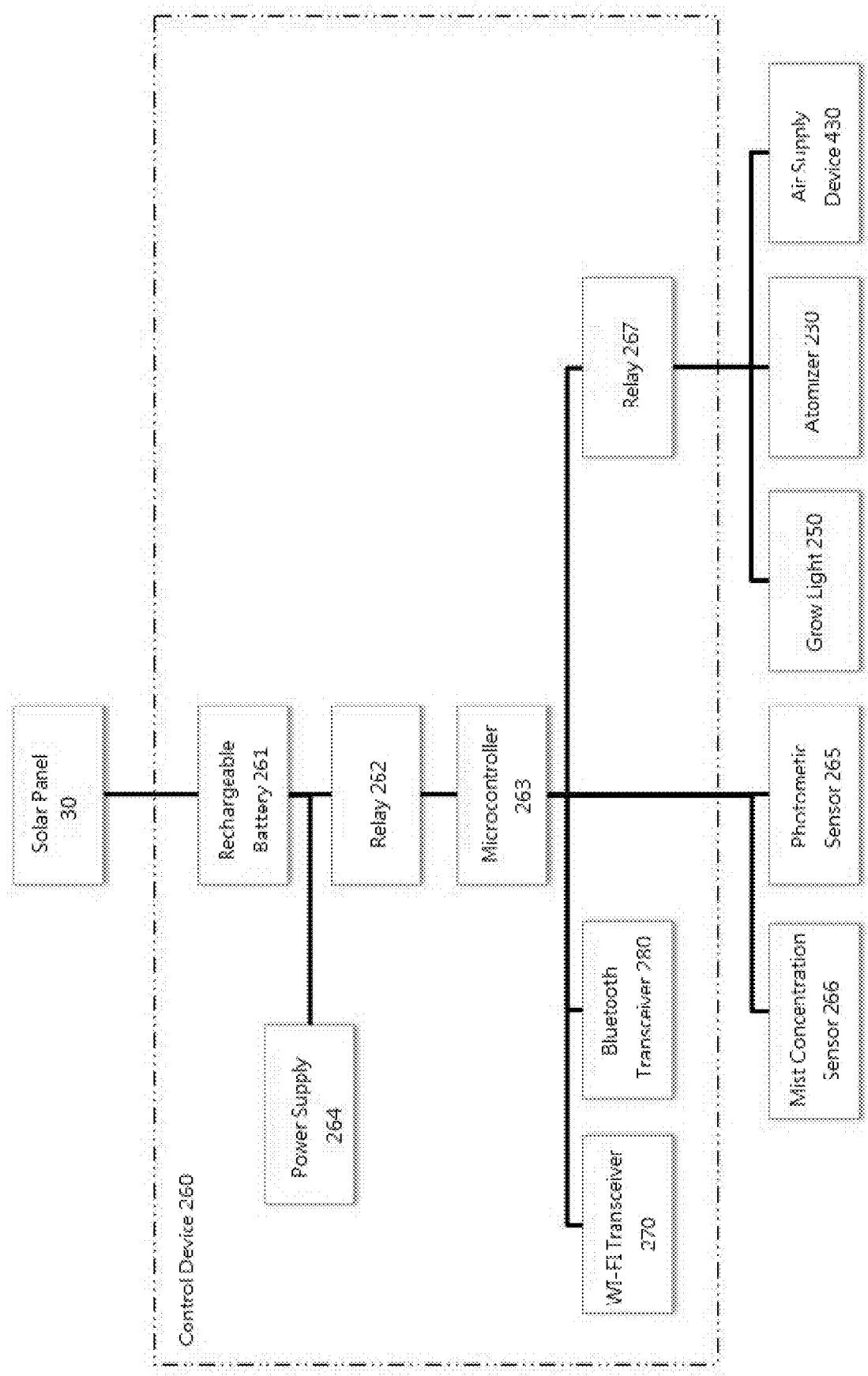
FIG. 20 is an electrical connection diagram of the control device of the grow box of the present invention.

Preferably, as shown in FIGS. 18-20, a lighting component, such as a foldable grow light 250, is arranged at the top of the grow box 20, so as to turn on the grow light 250 for the plants under the condition that the environment is lack of light. Moreover, the grow light 250 is connected with a photometric sensor 265, so as to detect the brightness of the environment. The grow light 250 can be a strip-shaped foldable LED lamp in or an incandescent lamp. These lamps can deliver light rays in various colors and wavelengths according to the needs of plant cultivation, and thus the growth of the plants is facilitated.

In an embodiment shown in FIG. 1, the grow light 250 is arranged on the grow box 20 through a connecting assembly, wherein the connecting assembly comprises a holder 251 arranged on the frame 110 and a multi-position hinge 252. One end of the multi-position hinge 252 is fastened on the holder 251, and the other end of the multi-position hinge 252 is connected with the grow light 250, so as to control the state of the grow light 250 to be folded or unfolded by changing the hinge position. Also, the holder 251 can be directly arranged at the edge of the grow box 20. In another embodiment, the grow light 250 does not adopt the holder 251, instead, the multi-position hinge 252 is directly arranged at the edge of the grow box 20 for cost reduction. In addition, the connecting assembly is provided with a height adjuster to control the distance between the grow light 250 and the plants, so as to change the lighting distance according to the environment condition.

As shown in FIG. 20, a control device 260 (as shown in dotted lines) is arranged on the box body of the grow box 20, which controls the various components and processes of the entire grow box 20 under the condition that the power is connected. The control device 260 comprises a microcontroller 263, a rechargeable battery 261 and a connected power supply, etc. For example, the box body of the grow box 20 of the present invention comprises a mist concentration sensor 266 in communication with the control device 260, while the atomizer 230 or 2301 is connected with the relay 267. The control device 260 controls the mist concentration sensor 266 to detect whether the nutrient solution is exhausted, or whether the atomizer works correctly. The control device 260 controls the switches of the atomizer 230 or 2301, the grow light 250 and the air supply device 430 through the relays 267. If the control device 260 detects that an individual atomizer 230 or 2301 is abnormal, the other atomizer 230 or 2301 is automatically started to prevent the plants from being dried to death. In addition, the box body of the grow box 20 comprises a water level gauge, such as a float-type water level gauge or an electronic water level gauge in communication with the control device 260, so as to detect whether the nutrient solution is exhausted. The photometric sensor 265 is electrically connected with the control device 260, so as to turn on the grow light 250 for the plants under the condition that the environment is lack of light.

The control device 260 can be made into an integrated structure, such as a box-shaped structure, arranged on the frame 110 or at the edge of the grow box 20 for the convenience of installation and operation.

The grow box 20 of the present invention can be powered with the residential electricity, such as powered through the control device 260 with the residential electricity, so as to connect with the entire electrical system. For example, the control device 260 can select a power supply 264 from different power sources, so as to supply power to various electronic components. To accomplish energy-saving for the environment, the grow box 20 is provided with a solar device, comprising a solar panel 30, a rechargeable battery 261, a relay 262 and related circuits. The solar panel 30 is arranged on one side of the grow box 20, so as to receive solar energy to charge the rechargeable battery 261 and supply power to the control device 260. Alternatively, the solar panel 30 can be independently arranged, i.e. placing the solar panel 30 under the sunlight and connecting through a cable. Other components, including the rechargeable battery 261 and the relay 262, are arranged on one side of the grow box 20 close to the control device 260. In general circumstances, the grow box 20 of the present invention selects the power source of the solar device in priority. The residential electricity is selected only when the rechargeable battery 261 is excessively low, and thus the operating electricity cost is greatly reduced.

In an embodiment, in order to make the whole operation intelligent, a wireless communication device is arranged in the control device 260, such as a WI-FI transceiver 270 and/or a Bluetooth transceiver 280. Under the condition that the network is connected, the control device 260 can communicate with an external intelligent terminal. The intelligent terminal can be a mobile phone or a computer. Through the communication between the intelligent terminal and the control device 260, users can remotely control and manage the grow box 20. For example, the mist concentration sensor 266 can be controlled to perform automatic induction constantly, or to perform automatic induction periodically. Under the condition that the nutrient solution is required, the atomizer is controlled to perform atomization, so that the nutrient solution can be supplied to the plants in time, preventing the plants from being dried to death due to human errors. Alternatively, by using the remote-control feature, users can turn any individual atomizer on and off, and define the auto-start conditions for the grow light and the atomizer, etc.

Figure 21:
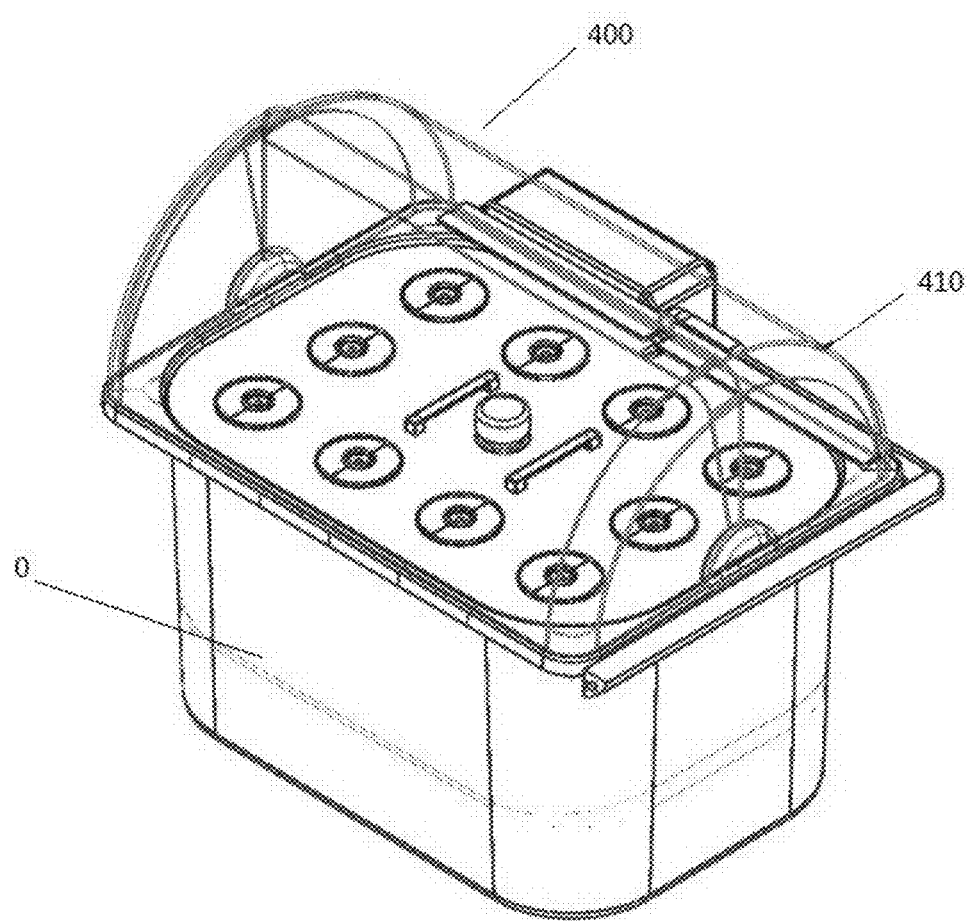
FIG. 21 is a structural diagram of the greenhouse cover of the grow box of the present invention.
Figure 22:
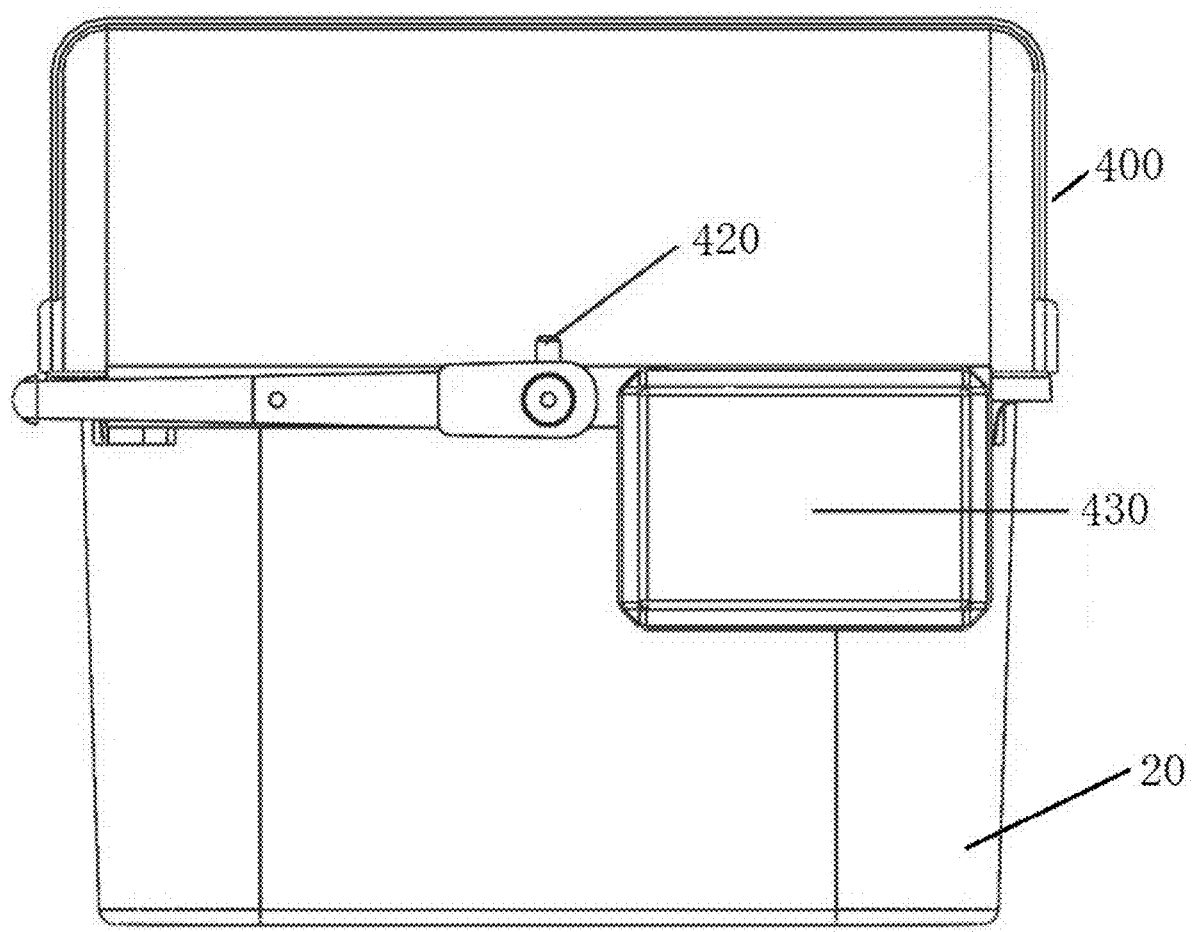
FIG. 22 is a diagram of the greenhouse cover and the air supply device of the grow box of the present invention.

As shown in FIGS. 21 and 22, according to an embodiment of the grow box 20 of the present invention, a transparent greenhouse cover 400 is arranged on the box body of the grow box 20, so as to create greenhouse effect for the plants. Meanwhile, the transparent greenhouse cover 400 can prevent the plants from being blown by wind and troubled by insects, so as to assist the plants in growing healthily. Preferably, the greenhouse cover 400 comprises a movable cover element 410 and a hole 420, and the hole 420 of the greenhouse cover is used for creating a passage of cables and pipelines, such as a passage for the cables connected with the mist concentration sensor and the atomizer. The movable cover element 410 can be opened by hands, so as to facilitate manual operation.

Further, an air supply device 430, such as an air pump, is arranged on the box body of the grow box 20. The air supply device 430 is electrically connected with the control device 260, so as to supply fresh air into the greenhouse cover 400 and/or into the box body of the grow box 20 through a pipeline. Alternatively, under the condition that the greenhouse cover 400 is absent, the air supply device 430 can be used to supply fresh air into the box body of the grow box 20 directly.

Figure 23:
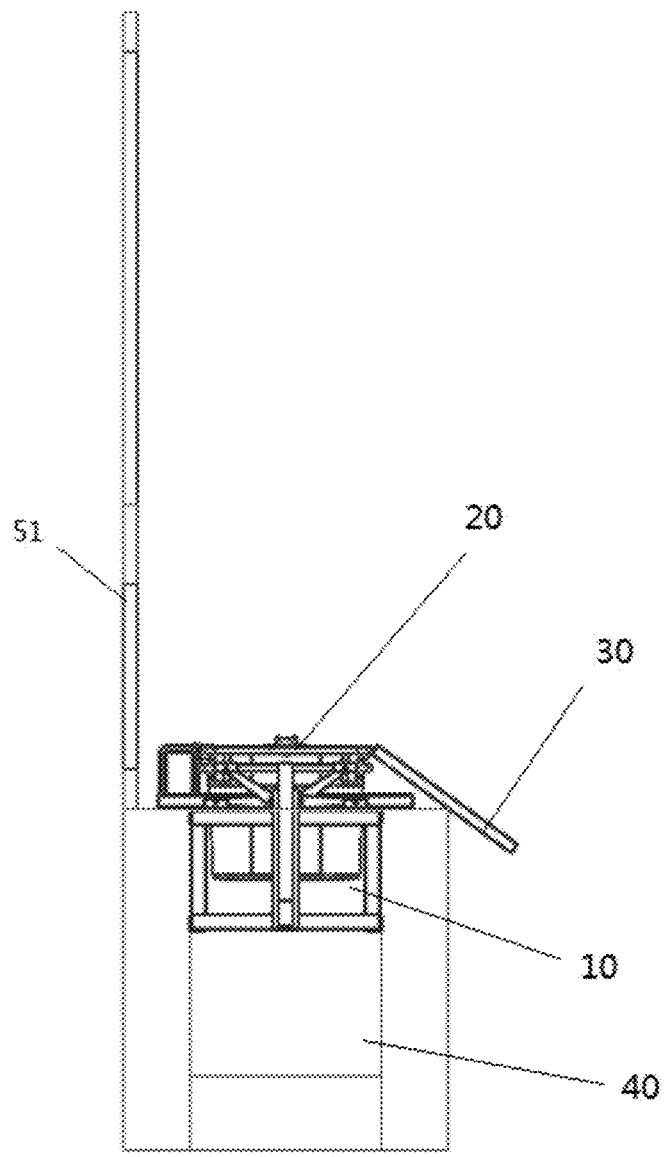
FIG. 23 is a side view of the plant grower being embedded into the window box.
Figure 24:
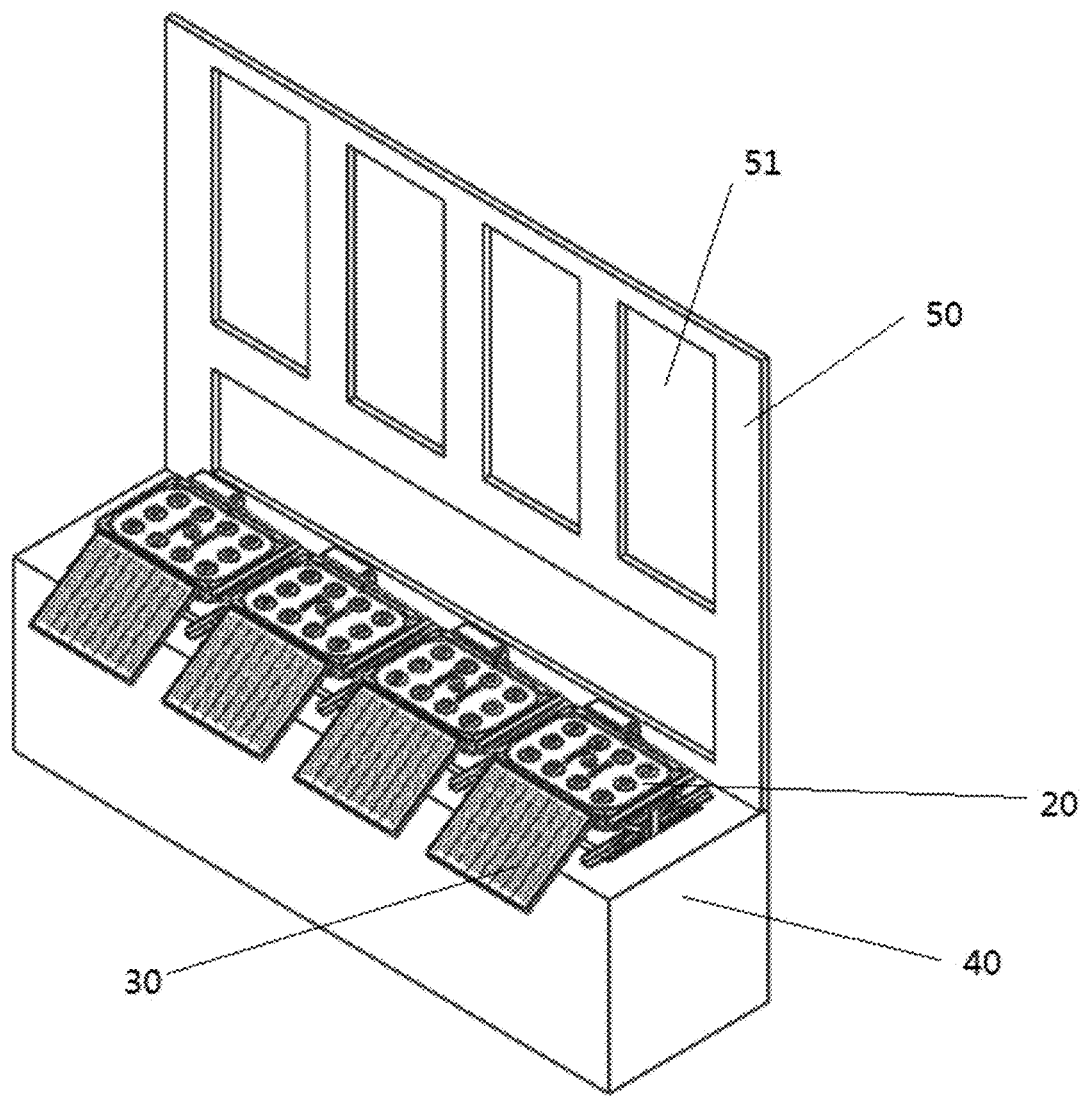
FIG. 24 is an isometric view of the plant grower being embedded into the window box.

As shown in FIG. 23 and FIG. 24, when using the plant grower of the present invention, first of all, the supporting device 10 is embedded into a window box 40. The entire grow box 20 with related components, such as the control device 260, is placed in the supporting device 10. The solar panel 30 is ensured to face towards the sunlight. If the window box is too long, a plurality of the plant growers of the present invention can be arranged, as shown in FIG. 24, to cultivate more plants. Users can process farming tasks through a window 51 of a window frame 50 with the plant grower of the present invention. Under the condition that the intelligent control is present, the plant grower operates itself as soon as the power is connected. The remote-control feature can be used to monitor the processes of the plant grower, or to change the intelligent control settings.

The foregoing embodiments only represent the preferred embodiments of the present invention. Their descriptions are concrete and detailed, but they shall not be therefore understood as limitations to the scope of the present invention. It should be noted that for those skilled in the art, various changes and modifications may be made to the embodiments without departing from the spirit of the present invention, such as combinations of different features of the embodiments. All these should be in the protective scope of the present invention.

What is claimed is:

1. A grow box, comprising:
   a box body;
   a cover constructed to match with the box body and cover the box body;
   a planting unit arranged on the grow box for planting plants;
   a nutrient solution supply unit comprising a nutrient solution storage chamber and an atomizer, the nutrient solution supply unit constructed to supply nutrient solution to the roots of the plants under the condition that the plants lack nutrient solution;
   wherein the nutrient solution storage chamber is constructed as a part of box body space which is separated from the box body by a partition plate;
   and the partition plate is provided with a mounting position for installing the atomizer; and
   wherein the atomizer comprises a liquid absorbing component and an atomizer nozzle with a microporous atomizing sheet, the atomizer nozzle being arranged on the mounting position and connected to the liquid absorbing component.

2. The grow box according to claim 1, wherein the planting unit comprises a plurality of planting baskets which passes through, in one-to-one correspondence manner, a plurality of pre-arranged holes on the cover and sits inside the box body, in which the planting baskets are supported by the cover.

3. The grow box according to claim 2, wherein each of the planting baskets is provided with a moisturizing cap, so as to prevent the nutrient solution from being dried.

4. The grow box according to claim 1, wherein the partition plate is abutted against the inner wall of the box body, and a liquid removing hole is formed on the partition plate.

5. The grow box according to claim 3, wherein the partition plate is configured with a certain degree of inclination, so as to facilitate guiding liquid to flow into the nutrient solution storage chamber.

6. The grow box according to claim 1, wherein the partition plate is provided with a liquid inlet pipe, and one end of the liquid inlet pipe passes through a pre-arranged hole on the cover, while the other end passes through the partition plate and reaches the nutrient solution storage chamber.

7. The grow box according to claim 6, wherein a water level gauge is arranged on the liquid inlet pipe, so as to observe the remaining amount of the nutrient solution.

8. The grow box according to claim 1, wherein the atomizer is a buoyancy atomizer comprising an atomizer nozzle, while an atomizer limiting component is arranged on the mounting position, so that the atomizer can be arranged in the limiting component, wherein the limiting component is immersed into the nutrient solution storage chamber.

9. The grow box according to claim 8, wherein the limiting component is a limiting hood, the buoyancy atomizer is limited within the limiting hood and is in float along with the liquid level.

10. The grow box according to claim 9, wherein the atomizer is provided with a buoyancy structure, and the atomizer nozzle is arranged in the buoyancy structure.

11. The grow box according to claim 8, wherein the partition plate is provided with a liquid inlet pipe, and one end of the liquid inlet pipe passes through a pre-arranged hole on the cover, while the other end passes through the partition plate and reaches the nutrient solution storage chamber.

12. The grow box according to claim 11, wherein a water level gauge is arranged on the liquid inlet pipe, so as to observe the remaining amount of the nutrient solution.

13. The grow box according to claim 1, wherein the grow box comprises a control device which is arranged on the box body and is electrically connected with the atomizer so as to automatically supply the nutrient solution to the plants.

14. The grow box according to claim 13, wherein the grow box further comprises a mist concentration sensor, which is arranged in the grow box and is in communication with the control device, so as to detect whether the nutrient solution required by the plants is exhausted, or whether the atomizer works correctly.

15. The grow box according to claim 13, wherein a lighting component is arranged at the top of the grow box and is electrically connected with the control device, so as to supplement light to the plants under the condition that the environment is lack of light.

16. The grow box according to claim 15, wherein the lighting component is connected with a photometric sensor and is electrically connected with the control device, so as to detect the brightness of the environment.

17. The grow box according to claim 15, wherein the lighting component is arranged at the edge of the box body through a connecting assembly with a multi-position hinge, which controls the state of the lighting component to be folded or unfolded by changing the hinge position.

18. The grow box according to claim 13, wherein the grow box comprises a solar device, which is arranged on one side of the box body, so as to receive solar energy to charge a rechargeable battery and supply power to the control device.

19. The grow box according to claim 13, wherein the control device comprises a wireless communication device to communicate with an external intelligent terminal, so as to remotely control and manage the grow box.

20. The grow box according to claim 13, wherein a transparent greenhouse cover is arranged on the box body, so as to create greenhouse effect for the plants.

21. The grow box according to claim 20, wherein the greenhouse cover comprises a movable cover element and a hole, and the hole of the greenhouse cover is used for creating a passage of cables and pipelines.

22. The grow box according to claim 20, wherein an air supply device is arranged on the box body and is electrically connected with the control device, so as to supply fresh air into the greenhouse cover and/or into the box body through a pipeline.

23. The grow box according to claim 13, wherein an air supply device is arranged on the box body and is electrically connected with the control device, so as to supply fresh air into the box body through a pipeline.

24. A plant grower comprising a supporting device and the grow box according to claim 1 which is arranged in the supporting device, wherein the supporting device comprises:
a frame;
a holder arranged on the frame for holding the grow box; and
a height and inclination adjusting assembly arranged on two sides of the frame and the holder, so as to adjust the lifting height and/or the inclination angle of the holder.

25. The plant grower according to claim 24, wherein the height and inclination adjusting assembly comprises two sets of components, one set of components is arranged at one end of the frame, and the other set of components is arranged at the opposite end of the frame, each set of components comprises a sliding rail, a sliding block and two stay hinges, wherein the sliding rail is fastened on the frame, and one end of the sliding block is arranged on one side of the holder, and the other end of the sliding block is arranged in the sliding rail, so as to be capable to slide along the sliding rail.

26. The plant grower according to claim 25, wherein one end of the stay hinge is fastened on the frame, and the other end of the stay hinge is fastened on the holder, so as to slide the sliding block vertically through the movement of the stay hinge, or to set the holder inclined at certain angle under the condition that the sliding block is fixed.

* * * * *